Figure 1:
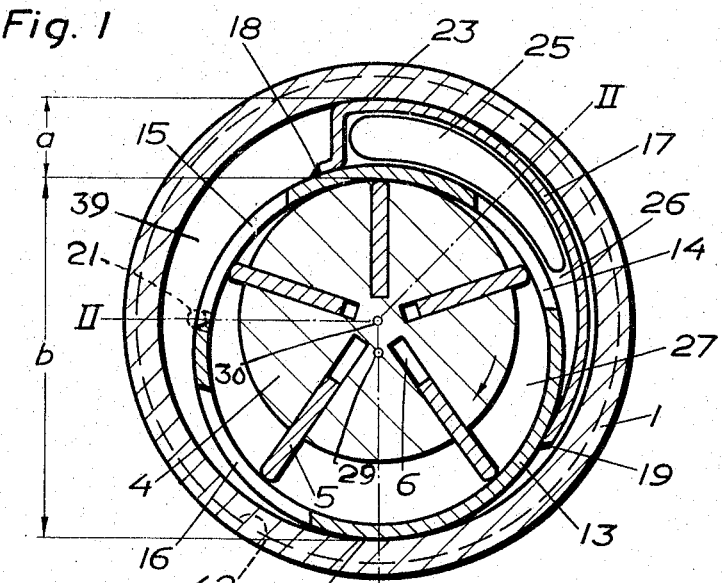

March 7, 1967 B. G. LARSSON 3,307,454

ROTARY PISTON MACHINES AND CYLINDER HOUSINGS

Filed June 19, 1964 2 Sheets-Sheet 1

INVENTOR.
Bo Gunnar Larsson
BY Greer Maréchal Jr
Attorney

March 7, 1967 B. G. LARSSON 3,307,454
ROTARY PISTON MACHINES AND CYLINDER HOUSINGS
Filed June 19, 1964 2 Sheets-Sheet 2

INVENTOR.
Bo Gunnar Larsson
BY Greer Maréchal Jr.
Attorney

United States Patent Office 3,307,454
Patented Mar. 7, 1967

3,307,454
ROTARY PISTON MACHINES AND CYLINDER HOUSINGS
Bo Gunnar Larsson, Ektorp, Sweden, assignor to Atlas Copco Aktiebolag, Nacka, Sweden, a corporation of Sweden
Filed June 19, 1964, Ser. No. 376,387
12 Claims. (Cl. 91—121)

This invention relates to cylinder housings of rotary piston machines of the sliding vane type and to machines provided with such housings. Rotary piston machines of the sliding vane piston type are used to a great extent as pressure fluid motors for pressure fluid driven tools such as pneumatic or hydraulic tools. Rotary piston machines of this type are also used as motors for many other purposes, for instance in hoists, winches, mixers, loaders, pumps, vibrators etc., and such machines are also in many cases used as liquid or gas pumps or as compressors. In the common design of this type of machine substantially two types of cylinders have been used one type being a forged cylinder and the other a cast cylinder. The forged cylinder requires a large amount of expensive machining If carried out with great accuracy this machining results in an outstanding product in which a desired hardness of the wearing surfaces of the cylinder may be obtained. However, apart from being expensive such cylinders are also heavy. The cast cylinders can more easily be given desired dimensions but it is not possible to carry out such cylinders with the desired hardness and other properties of the wearing surfaces in the cylinder. The cast cylinder is furthermore also rather heavy. One object of this invention is to avoid these disadvantages and to produce a cylinder which can be made extremely light and with the desired material properties and which may particularly be made hard and resistant to wear. A still further object of the invention is to avoid as much as possible machining of the cylinder. Another object of the invention is to provide a cylinder which takes little space and which therefore in a conventional tool leaves much space for noise dampening means, lubricating oil compartments, et cetera. A still further object of the invention is to provide a cylinder which can be made with sufficient accuracy without much machining or expensive machining operations. A further object of the invention is to provide a cylinder housing which can be made from a large portion of common simple tubular stock and which is cheap and easy to manufacture and to assemble.

In the accompanying drawings three embodiments of rotary piston machine cylinder housings according to the invention are illustrated by way of example together with a complete machine and a modification.

Figure 2:
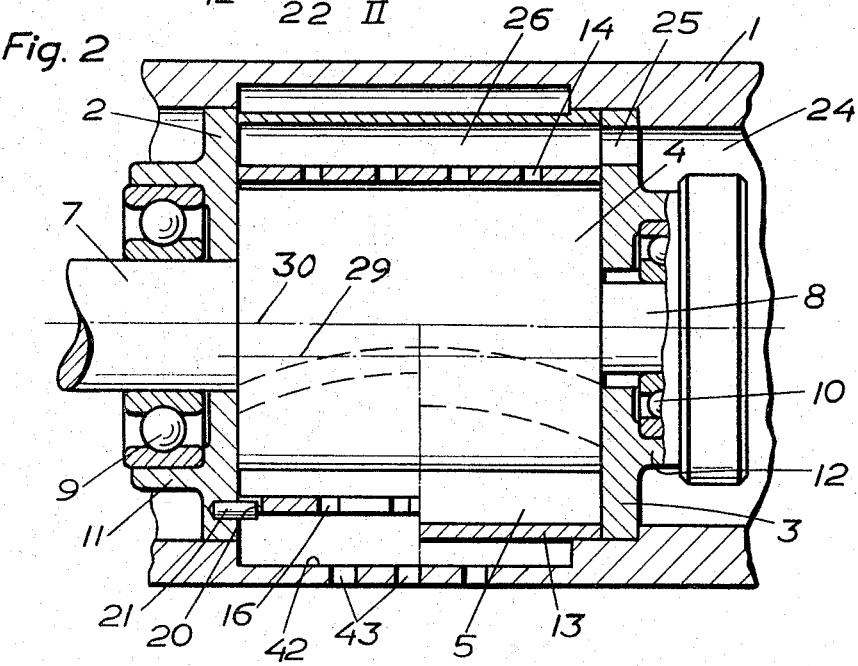
Figure 3:
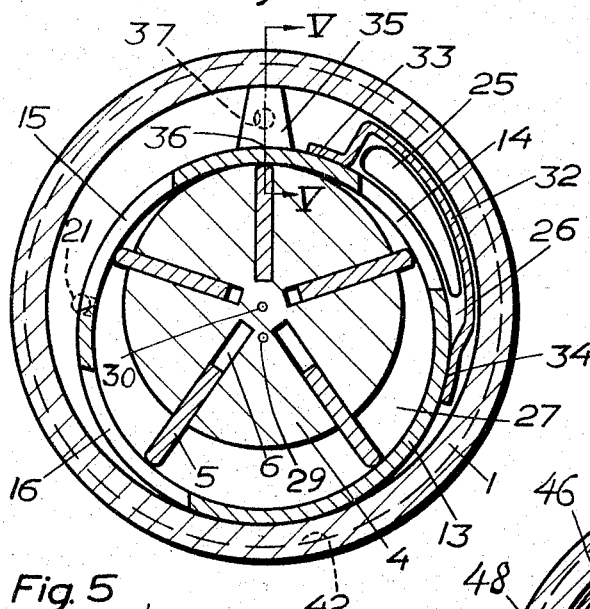
Figure 5:
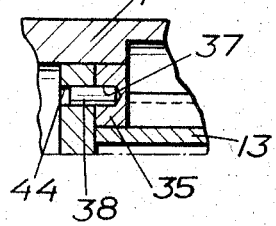
Figure 4:
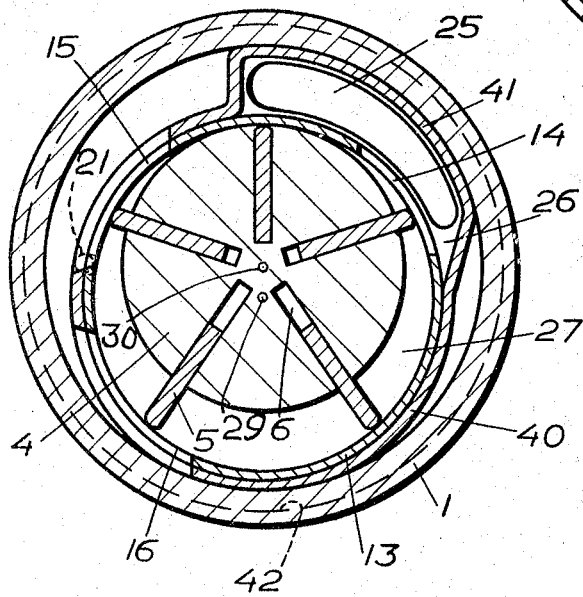
Figure 6:
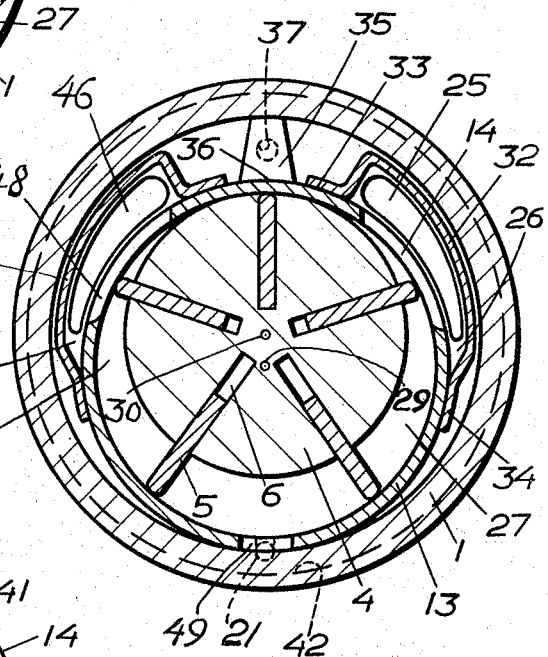

FIG. 1 is a cross section of a rotary piston sliding vane machine provided with a cylinder housing according to the invention. FIG. 2 is an axial section on the lines II—II in FIG. 1 of the machine according to FIG. 1, the section being horizontal in the lower left portion of FIG. 2 and vertical in the right hand portion. FIG. 3 is a transverse cross section similar to FIG. 1 of a similar machine having another embodiment of the cylinder housing. FIG. 4 is a cross section of a similar machine showing a third embodiment of the housing according to the invention and FIG. 5 is a detail section on lines V—V in FIG. 3. FIG. 6 is a modification of the machine in FIG. 3 of reversible type.

In the various figures identical elements have been designated with the same reference numerals and are therefore only described in connection with FIG. 1. In the various figures 1 designates a cylinder casing which may, for instance, form a part of the casing of an impact wrench or other rotary tool. 2 is the front cylinder wall and 3 the rear cylinder wall. 4 is a rotor in which a number of sliding vane pistons 5 are mounted for radial movements in slots 6 in the rotor 4 which is carried by stub shafts 7, 8 mounted in antifriction bearings 9, 10 fitted in counter cores in bosses 11, 12 extending from the walls 2 and 3, respectively.

In the embodiment of FIGS. 1 and 2 the rotor 4 is mounted for rotation in a cylinder housing comprising a tubular body 13 which according to the invention is made in one piece cut from tubular stock of very accurate dimensions. Three groups of radial slots 14, 15, 16 are provided in the tubular body 13 while said body is in soft condition. The slotted bodies 13 are then treated in a tumbling mill in order to remove all sharp edges particularly around the ports 14, 15, 16. A separately formed member 17, which is carried out by cutting pieces from rolled stock of sheet material having the cross section of the member 17, is then fixed to the outside of the tubular body 13 by seamwelding, as indicated at 18 and 19, so that an air tight connection with the body 13 is obtained along the whole length of the member 17. The body 13, 17 is machined at the ends and a recess 20 is provided for receiving a positioning spring pin 21 secured in the end wall 2 and serving to fix the body 13 against rotation when the tubular body is assembled into the casing 1. After treatment in the drum or tumbling mill the body 13, 17 is case hardened and thereafter the internal surface of the body 13 is polished and the body is placed on a mandrel for grinding the diametrically opposed outside portions 22 and 23 of the body 13, 17 thereby securing correct measures of the distances $a$ and $b$ (FIG. 1) which is sufficient for accurate operation of the rotary machine. 29 indicates the cylinder center line and 30 the rotor center.

It is obvious from the above that very little machining has to take place on the cylinder housing and also the surfaces which have to be ground are rather small which naturally reduces the costs for manufacturing the cylinders. Furthermore, since the tubular member 13 is made of tubular stock which can be obtained in any desired material and with very accurate dimensions it is possible according to the invention to choose a material which after hardening gives surface conditions on the finished products which was not possible in the cast material previously used for cylinder housings of this type.

The illustrated machine is a compressed air motor which has a compressed air inlet chamber 24 to which compressed air is supplied over a conventional main valve and sometimes over a governor valve of conventional design as the case may be, said valves and operating means therefore are not illustrated since they have nothing to do with this invention. From the chamber 24 a port 25 leads into the inlet passage 26 formed between the tubular member 13 and the member 17. From the inlet passage 26 the air flows through the ports 14 into the working chamber 27 of the cylinder housing to drive the rotor and then escapes through the ports 15 and 16 into the exhaust and silencing chamber 39 and through a groove 42 and ports 43 to the atmosphere. In machines operating in one direction only and of the illustrated types, the spring pin 21 provided in the end wall 2 acts to keep the cylinder housing 13, 17 in a fixed position.

In the embodiment of the invention illustrated in FIG. 3 the tubular body 13 is carried out in the same way as in FIG. 1 but the inlet passage 26 is provided by a member 32 which is cut from rolled sheet stock with a cross section as illustrated by the member 32. At 33 and 34 the member 32 is seamwelded to the body 13. Furthermore a lug 35 is spotwelded at 36 to the body 13, said lug 35 having an axial bore 37. A spring pin 38 inserted through a bore 44 in the end wall 2 and into the bore 37 keeps the lug 35 and the cylinder housing 13 in a fixed position.

In the embodiment of FIG. 4 the tubular member 13 is surrounded by a tubular member 40 which fits snugly around the tubular member 13 over the major part of the periphery of the member 13 and forms the axial passage 26 by a portion 41 which is formed by a lobe of the wall of the tubular member 40. The member 40 may be glued to the body 13 by means of a suitable artificial glue suitable for bonding metals together and capable of resisting the temperature of the cylinder in operation.

FIG. 6 shows the embodiment of FIG. 3 modified for a reversible air motor. For this purpose the cylinder housing has a second axial passage 31 similar to the passage 26 and formed by a member 45 formed and arranged as a mirror image of the member 32. The chamber 24, FIG. 2, of the reversible machine is in conventional manner divided in two chambers one communicating with the passage 26 through the port 25 and the other with the passage 31 through a port 46. The passage 31 communicates with the cylinder chamber 47 through a number of slots 48 forming ports in the wall of the member 13 similar to the ports 14. The member 13 is provided with exhaust ports 49 communicating with the exhaust groove 42. A conventional shift valve may be provided for supplying working fluid selectively through one of the chambers 24 to the passages 26 or 31 for rotation forward or reverse, respectively, and for venting the passage 31 or 26 which is not connected to the working fluid supply. Such arrangement may, for instance, be as disclosed in U.S. Patent No. 2,733,687, to Schmid filed Oct. 27, 1954.

The embodiments of the invention above described and illustrated in the drawings should only be considered as examples and may be modified in several different ways within the scope of the following claims.

What I claim is:

1. In sliding vane rotary piston machine apparatus of the character described having a cylinder casing with an end wall disposed at each end thereof and with a sliding vane rotor body rotatably mounted in said casing, the combination which comprises a preformed replaceable tubular body assembly for insertion and fitting in said cylinder casing and extending from one end wall thereof to the other end wall and forming both the working cylinder in which said rotor rotates and axially extending flow passages within said casing, said assembly including a tubular body forming said working cylinder, radially disposed inlet and outlet ports in said tubular body for providing pressure fluid entry and exit therein under the action of said rotor, and a separately preformed member of arcuate cross section affixed over a portion only of the external surface of said tubular body prior to the insertion of said assembly into said casing and adjacent said inlet and outlet ports in said tubular body, said separately preformed member extending from one end wall of said cylinder casing to the other for providing said axially extending flow passages between said ports and one end wall of said cylinder casing, and the maximum transverse dimension of said tubular body with said arcuate preformed member affixed thereon is such that no more than a longitudinally extending portion only of the entire external surface of said assembly directly contacts the inside of said cylinder casing for fitting engagement therewith at substantially diametrically opposed portions thereof for positioning and supporting said tubular body assembly therein.

2. Apparatus as recited in claim 1, in which said tubular body is a piece of tube cut off perpendicularly to its axis and having at least two groups of peripherally extending through slots therein forming a group of inlet ports and a group of outlet ports for a working fluid and extending radially through the tube wall.

3. Apparatus as recited in claim 1, in which said separately preformed member is a piece of rolled sheet material cut off perpendicularly to its longitudinal direction and having two longitudinal flanges formed to fit tightly to the outside of the tubular body and an intermediate portion forming together with the outside of said tubular body said axial passage.

4. Apparatus as recited in claim 1, in which said separately preformed member is a piece of drawn tube material cut off perpendicularly to its longitudinal axis and having a first portion fitting snugly around a corresponding portion of the tubular body and a second portion forming said axial passage and extending along another portion of the tubular body in which said ports are provided.

5. Apparatus as recited in claim 1, in which said separately preformed member has an arcuate cross section decreasing in radial depth from a maximum at one end to a minimum at the opposite end of the cross section.

6. Apparatus as recited in claim 1, in which said tubular body is preformed of a soft piece of tube, which is provided with radial port openings and to which is fixed the separately preformed member providing the said axial passage in communication with the interior of the tubular body through a group of said port openings, and in which said preformed tubular body and preformed member are heat treated to great hardness and ground to exact dimension before being disposed in said cylinder casing.

7. Apparatus as described in claim 1, in which said tubular body has a radially extending lug fixedly disposed on the outside of said body at one end thereof and extending radially to said adjacent cylinder casing, said lug having a bore disposed therein for receiving a spring bolt extending from the adjacent end wall for preventing the relative rotation of said tubular body and said cylinder casing.

8. Apparatus as described in claim 1, in which said separately preformed member is welded to said tubular body.

9. Apparatus as described in claim 1, in which said separately preformed member is glued to said tubular body.

10. Apparatus as described in claim 1, in which a narrow longitudinally extending portion only of the external surfaces of said preformed tubular body and said separately preformed member affixed thereon are ground for causing the radial extent of said tubular body and said preformed member thereon to be accurately dimensioned for fitting between substantially diametrically opposed internal surface portions of said cylinder casing.

11. Apparatus as described in claim 1, in which said separately preformed member is disposed on said tubular body adjacent said inlet ports for providing flow communication between said inlet ports and one end wall of said cylinder casing, and in which a second separately preformed member is affixed over a portion only of said tubular member on the opposite side of an axial plane of said body and adjacent said outlet ports for providing an axially extending flow communication passage between said outlet ports and the outside of said cylinder casing.

12. Apparatus as described in claim 1, in which means are provided for reversing pressure fluid flow through said axially extending passages of said first and second preformed members for reversing the direction of rotation of the said rotor.

References Cited by the Examiner

UNITED STATES PATENTS

| | | | |
|---|---|---|---|
| Re. 23,086 | 2/1949 | Holl | 103—120 |
| 1,871,525 | 8/1932 | Hudson | 103—136 |
| 2,715,889 | 8/1955 | Sturrock | 91—80 |
| 3,190,183 | 6/1965 | Walker | 91—121 |
| 3,209,656 | 10/1965 | Thieme | 91—381 |

FOREIGN PATENTS 1,000,099   2/1952   France.

MARTIN P. SCHWADRON, *Primary Examiner.*

EDGAR W. GEOGHEGAN, *Examiner.*

P. T. COBRIN, I. C. COHEN, *Assistant Examiners.*